United States Patent
Pedersen et al.

(10) Patent No.: US 7,159,525 B2
(45) Date of Patent: Jan. 9, 2007

(54) HYDRAULIC STEERING ARRANGEMENT

(75) Inventors: Poul Henning Holm Pedersen, Soenderborg (DK); Tom Rudolph, Ames, IA (US); Lee Mahlum, Ames, IA (US); Radoslaw Kornicki, Soenderborg (DK); Bjarne Schmidt, Augustenborg (DK)

(73) Assignee: Sauer-Danfoss ApS, Nordborg (DK)

( * ) Notice: Subject to any disclaimer, the term of this patent is extended or adjusted under 35 U.S.C. 154(b) by 392 days.

(21) Appl. No.: 10/871,962

(22) Filed: Jun. 18, 2004

(65) Prior Publication Data

US 2005/0022522 A1  Feb. 3, 2005

(30) Foreign Application Priority Data

Jun. 20, 2003 (DE) ............... 103 28 114

(51) Int. Cl.
*B63H 25/22* (2006.01)
*B63H 5/125* (2006.01)

(52) U.S. Cl. .............. 114/150; 440/61 S; 60/325
(58) Field of Classification Search ........... 114/150; 440/61 R, 61 S, 61 A, 61 C
See application file for complete search history.

(56) References Cited

U.S. PATENT DOCUMENTS 4,449,470 A * 5/1984 Rump .................. 114/150
5,887,429 A * 3/1999 Bergmann et al. ........... 60/384
6,213,247 B1 * 4/2001 Rom et al. ................. 180/441
6,821,168 B1 * 11/2004 Fisher et al. ............. 440/61 R

OTHER PUBLICATIONS

Sauer-Danfoss, "OSPM Mini-steering unit, OTPM steering column Technical Information", 2001 ; pp. 1-15.

* cited by examiner

*Primary Examiner*—Jesús D. Sotelo
(74) *Attorney, Agent, or Firm*—McCormick, Paulding & Huber LLP

(57) ABSTRACT

The invention concerns a hydraulic steering arrangement with a steering motor, a supply path between a pressure source and the steering motor, in which supply path a throttling device and a measuring motor are located, a return path between the steering motor and a pressure sink, in which return path a return throttle is located, and a bypass path, which connects the supply path and the return path on the pressure source end or the pressure sink end, respectively, and which has a bypass throttle. It is endeavoured to make such steering arrangements suitable for fast motorboats. For this purpose it is ensured that with a load on the steering motor the pressure drop over the bypass throttle is larger than the sum of the pressure drops between a point before the first throttle and a point after the last throttle of the throttling device.

8 Claims, 1 Drawing Sheet

HYDRAULIC STEERING ARRANGEMENT

CROSS-REFERENCE TO RELATED APPLICATIONS

This application is entitled to the benefit of and incorporates by reference essential subject matter disclosed in German Patent Application No. 103 28 114.2 filed on Jun. 20, 2003.

FIELD OF THE INVENTION

The invention concerns a hydraulic steering arrangement with a steering motor, a supply path between a pressure source and the steering motor, in which supply path a throttling device and a measuring motor are located, a return path between the steering motor and a pressure sink, in which return path a return throttle is located, and a bypass path, which connects the supply path and the return path on the pressure source end or the pressure sink end, respectively, and which has a bypass throttle.

BACKGROUND OF THE INVENTION

Such steering arrangements are, for example, available from Sauer-Danfoss (Nordborg) A/S, Nordborg, Denmark.

Such steering arrangements are mainly used in tractors and other mobile equipment. In a housing, the steering arrangement has an outer rotary slide and an inner rotary slide, which are connected with each other via a spring. When the inner rotary slide and the outer rotary slide are turned relative to each other, various throttles are opened or closed. For example, the throttling device in the supply path and the return throttle in the return path are opened, whereas the bypass throttle is closed. However, the bypass throttle and the throttles of the throttling device or the return throttle, respectively, have an overlap area, in which all throttles are open at the same time. The opening width of the throttles is determined by the relative angular position between the inner and the outer rotary slide. Hydraulic fluid flows through the throttling device and the measuring motor in the supply path. In this connection, the measuring motor resets the outer rotary slide in relation to the inner rotary slide, that is, returns them to their neutral positions, so that, in dependence of the deflection of a steering handwheel, a defined amount of hydraulic fluid can be permitted to flow to the steering motor. Thus, it is ensured that the position of the steered member has a certain relation to the angular position of the steering handwheel.

Such a steering arrangement has proved its value in connection with land vehicles. However, problems occur, when such a steering arrangement is to be used in a motorboat. This particularly applies, when the motorboat is configured for high speeds, that is, speeds of 100 km/h and higher. In a motorboat, the steering motor acts upon a rudder or the complete driving motor that includes the driving propeller. When the boat is at high speed, relatively large forces are counteracting upon the steering motor and thus upon the steering arrangement via the rudder or the driving motor, particularly in connection driving along a curve. These high pressures can also occur when driving straight because at high speeds the driving propeller is no longer completely immersed in the water. In this case, the propeller generates large side pressures. When, in connection with a land vehicle, a load of the steering motor in the magnitude of 5 to 10 bar can be assumed, the pressure when using the steering arrangement in a motorboat can range from 35 to 50 bar.

Usually, these large pressures can be managed particularly when the pressure is positive. Problems occur, where negative loads are concerned. In this case, situations may occur, in which the rudder is moved faster than specified by the steering handwheel or another steering device.

Based on the foregoing, it is the general object of the present invention to provide a hydraulic steering arrangement suitable for fast motorboats that improves upon or overcomes the problem and drawbacks associated with the prior art.

SUMMARY OF THE INVENTION

With a hydraulic steering arrangement as mentioned in the introduction, this task is solved in that with a load on the steering motor the pressure drop over the bypass throttle is larger than the sum of the pressure drops between a point before the first throttle and a point after the last throttle of the throttling device.

With this embodiment it can be avoided, particularly with a negative load, that the rudder moves more than specified by the steering wheel. Additionally, the expansion of the pressure drop over the bypass throttle will ensure that the pressure over the measuring motor is large enough to overcome the frictional forces in the tooth set. This is particularly essential, when the negative forces on the steering motor are so large that a very low pressure (practically 0 bar) is present in the area of the connection of the supply path to the steering motor. In this case, situations occur in which the measuring motor cannot move or cannot move fast enough to close the throttling device in the supply path.

Preferably, the bypass throttle and the return throttle are adapted to each other in such a manner that with a negative load the return throttle generates a pressure drop, which corresponds to the negative load. In this case, the pressure drop over the bypass throttle is in principle available for the supply of the supply path, particularly the driving of the measuring motor.

Preferably, the pressure drop over the bypass throttle corresponds to at least 2.5 times the pressure drop over the throttling device. Thus, the bypass throttle has a substantial resistance.

Preferably, the relation between an overlap area between the throttling device and the bypass throttle on the one side and the return throttle and the bypass throttle on the other side amounts to at least 1.25. The overlap area is an area, in which two throttles are open at the same time, that is, on the one side the throttling device and the bypass throttle, on the other side the return throttle and the bypass throttle, respectively. Now, the preferred embodiment can be achieved in that, in relation to a traditional steering arrangement, the opening characteristic for the return throttle is displaced delayed, thus not letting the return throttle open until a later time, and/or the bypass throttle is displaced at an earlier time, that is letting the bypass throttle close at an earlier time. This will make the dead band a little larger than usual. However, the leakage paths in the steering device get smaller, so that inner leakages are reduced.

Preferably, the relation is at least 1.6. This is a relatively high value. However, the high value ensures that an "overrun", that is, a hastening of the rudder in relation to the steering handwheel can be reliably avoided. With traditional steering arrangements, the relation is approximately 1.1.

Preferably, a non-return valve opening in the direction away from the pressure source is located between the pressure source and the branching of the bypass path from the supply path. Thus, it is possible, with large positive forces on the steering motor, to compensate for the "kickback", that is, to reduce reaction forces caused by the fact that the counter pressure from the steering motor is too high. With positive forces, hydraulic fluid from the steering motor can return to the pressure connection via the measuring motor and the throttling device. When a non-return valve is available, the hydraulic fluid cannot flow this way. The size of the bypass throttle will have importance in this connection. When the bypass throttle has a larger flow resistance and generates an accordingly large pressure drop, this reaction will not occur with large positive forces.

In a preferred embodiment, it is ensured that a throttle is located between the pressure sink and the connection of the bypass path and return path. Under certain circumstances, the above measures cause larger noise to occur, as the pressure level on the whole is increased. This noise can now be reduced because the throttle is built into the line to the pressure sink.

It is particularly preferred that the throttle is a constant throttle. Thus, the throttle is not adjusted by means of a relative rotation between the inner and the outer rotary slide, but has a constant flow resistance. This contributes to noise reduction in all operating situations.

BRIEF DESCRIPTION OF THE DRAWINGS

In the following, the invention is explained in detail on the basis of a preferred embodiment in connection with the drawings, showing.

DEATILED DESCRIPTION OF THE PREFERRED EMBODIMENTS

Figure 1:
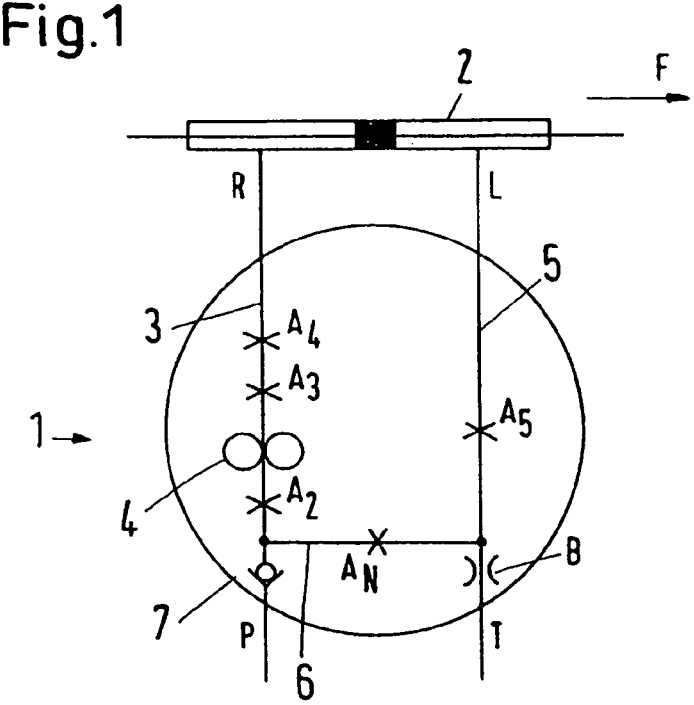
FIG. 1 is a schematic view of a steering arrangement
Figure 2:
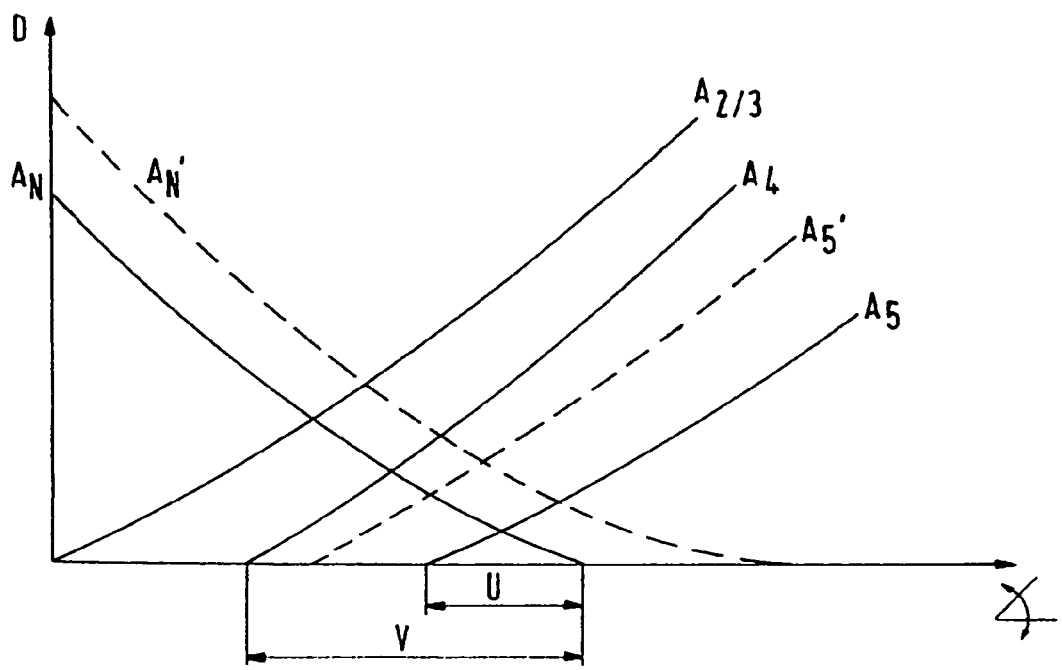
FIG. 2 shows curved courses of throttles in dependence of a rotation angle

FIG. 1 shows a schematic view of a steering arrangement 1, which controls a steering motor 2. Shown is a situation, in which a right working connection R can be supplied with pressurised hydraulic fluid, whereas hydraulic fluid can escape from the steering motor 2 through a working connection L. Of course, it is also possible to supply pressurised hydraulic fluid to the working connection L, the hydraulic fluid then escaping through the working connection R. The view is kept simple in order to make the following explanation simple.

The steering arrangement is supplied with pressurised hydraulic fluid from a pressure source P, for example a pump. The pressure source P is connected with a supply path 3, which again is connected with the working connection R. A throttling device comprising three throttles is located in the supply path 3. These throttles are called $A_2$, $A_3$, $A_4$. Further, a measuring motor 4 is also located in the supply path 3.

From the second working connection L, there is a return path 5 to a pressure sink T, which is, for example, a tank. In the return path 5 a return throttle $A_5$ is located. As mentioned above, a corresponding supply and return path is also available for the other control device, which is not shown for reasons of clarity.

At the pressure source end of the supply path 3, that is, in the flow direction through the supply path 3 before the throttle $A_2$, a bypass path 6 branches off, which ends in the return path 5 in the flow direction from the working connection L to the pressure sink T after the return throttle A5. A bypass throttle $A_N$ is located in the bypass path 6.

Between the pressure source P and the branching of the bypass path 6 from the supply path 3, a non-return valve 7 is located, which opens away from the pressure source P.

Between the connection between the bypass path 6 and the return path 5 on the one side and the pressure sink T on the other side is located a fixed throttle B. This fixed throttle B can, for example, be formed on a connection in the steering unit, for example on the tank connection. However, it is also possible to locate a fixed throttle elsewhere in a tank line.

The throttles $A_2$ to $A_5$ and $A_N$ are formed through an interaction of an inner rotary slide with an outer rotary slide. The inner rotary slide is turned in relation to the outer rotary slide, for example, under the influence of a steering wheel. Depending on the rotation angle between the inner and the outer rotary slides (the angle is shown to the right), the throttles $A_2$ to $A_4$ of the throttling device and the return throttle $A_5$ are increasingly opened, whereas the bypass throttle $A_N$ is increasingly closed. The magnitude of the opening is shown schematically upwards. In order to clarify the difference between the present steering arrangement and a traditional steering arrangement, the opening courses $A_5'$, $A_N'$ for a traditional steering arrangement are shown with dotted lines, for example a steering arrangement of the type OSPM from Sauer-Danfoss (Nordborg), Denmark, whereas the full lines show the opening courses of the steering arrangement shown in FIG. 1. The opening courses for the throttles $A_2$ to $A_4$ are the same in both cases.

It can be seen that the opening course of the return throttle $A_5$ is displaced to the right. In other words, the return throttle $A_5$ is opened later than has been the case until now. This causes the dead band to be somewhat larger than before. On the other hand, leakage paths in the steering arrangement 1 are kept small, which contributes to the reduction of inner leakages.

Accordingly, the closing curve of the bypass throttle $A_N$ is displaced to the left, that is, the bypass throttle $A_N$ closes earlier than before.

This causes that an overlap area U, in which both the bypass throttle $A_N$ and the return throttle $A_5$ are open, can be made smaller than before. An overlap area V between the throttling device with the throttles $A_2$ to $A_4$ and the bypass throttle $A_N$ is also reduced. This overlap area is determined by the opening of the last opening throttle $A_4$. The overlap area V is larger than the overlap area U by at least the factor 1.25. Usually, the overlap area V will even amount to at least 1.6 times the overlap area U. In the present embodiment, the relation is more than 2.

All other conditions being unchanged, the displacement of the opening curve of the return throttle $A_5$ causes a large pressure drop, when the steering starts. This gives an improvement in connection with negative loads, so that the rudder of the motorboat does not run away from the steering wheel. The counter pressure, which has built up, is larger than usual.

The displacement of the opening curve of the bypass throttle $A_N$ to the left also causes an improvement. When very large forces act upon the steering motor 2 (shown by F in FIG. 1), a relatively small pressure will be available at the working connection R, for example 0 bar. When here the flow resistance through the bypass throttle $A_N$ is increased, a larger pressure drop will occur at the bypass throttle $A_N$. Accordingly, a higher pressure will be available before the throttling device $A_2$ to $A_4$, so that the pressure over the measuring motor 4 is large enough to overcome the frictional forces in the toothed set. For example, a minimum pressure of 1 bar is required to move the toothed wheels in relation to each other. When the measuring motor can turn, it is possible to close the steering again to reduce the running away of the rudder in relation to the steering wheel.

Further, this involves the advantage that large positive forces on the steering motor 2 can reduce a retrospective force, when the pressure at the working connection R is larger than the pressure supplied by the pressure source P. In this case, hydraulic fluid could run through $A_4$, $A_3$, the measuring motor 2 and $A_2$. As, however, the non-return valve 7 is available, the hydraulic fluid cannot flow directly to the pressure source P, but must flow off through the bypass path 6 with the bypass throttle $A_N$.

Additionally to displacing the characteristics of $A_5$ and $A_N$, the characteristics can also be made more flat, particularly in an area, which corresponds to approximately the first 20 to 25% of U. This approximately corresponds to the rotation of 1°. For example, here an inclination of 0.3 mm$^2$/degree for $A_N$ and 0.6 mm$^2$/degree for $A_5$ can be used. In the traditional case, the values were 1.4 mm$^2$/degree for $A_N'$ and 1 mm$^2$/degree for $A_5'$.

A reduction of $A_N$ also gives improvements with regard to positive forces. When starting to steer with a large positive force, and immediately afterwards turns in the opposite direction, the feeling occurs that the steering handwheel turns on its own (this also applies, when the pressure from the steering cylinder is higher than the pressure, which $A_N$ can build up in this position). This again means that, when also here $A_N$ is dimensioned for pressures, which correspond to or are slightly higher than the cylinder pressure, the toothed set of the measuring motor will cause the slide set to close and cause a positive steering.

The characteristics for $A_5$ and $A_N$ can be displaced individually. However, a combination of the two displacements is advantageous.

The measures described above involve the disadvantage that they increase the pressure level, which may under certain circumstances cause noises. The noise problem is solved in that the fixed throttle B is used. The total amount of hydraulic fluid must flow through this throttle B, that is, both the hydraulic fluid from the return path 5 and the hydraulic fluid from the bypass path 6. This throttle B can, for example, exist in the form of a reduction of the diameter of a connection bore. However, the throttle B can also be arranged elsewhere in a tank line.

What is claimed is:

1. A hydraulic steering arrangement with a steering motor comprising: a supply path between a pressure source and the steering motor, in which supply path a throttling device and a measuring motor are located, a return path between the steering motor and a pressure sink, in which return path a return throttle is located, and a bypass path, which connects the supply path and the return path on the pressure source end or the pressure sink end, respectively, and which has a bypass throttle, and wherein with a load on the steering motor the pressure drop over the bypass throttle is larger than the sum of the pressure drops between a point before the first throttle and a point after the last throttle of the throttling device.

2. A hydraulic steering arrangement according to claim 1, wherein the bypass throttle and the return throttle are adapted to each other in such a manner that with a negative load the return throttle generates a pressure drop, which corresponds to the negative load.

3. A hydraulic steering arrangement according to claim 1, wherein the pressure drop over the bypass throttle ($A_N$) corresponds to at least 2.5 times the pressure drop over the throttling device ($A_2$, $A_3$, $A_4$).

4. A hydraulic steering arrangement according to claim 1, wherein the relation between an overlap area between the throttling device and the bypass throttle on the one side and the return throttle and the bypass throttle on the other side amounts to at least 1.25.

5. A hydraulic steering arrangement according to claim 4, wherein the relation is at least 1.6.

6. A hydraulic steering arrangement according claim 1, wherein a non-return valve opening in the direction away from the pressure source is located between the pressure source and the branching of the bypass path from the supply path.

7. A hydraulic steering arrangement according to claim 1, wherein a throttle is located between the pressure sink and the connection of bypass path and return path.

8. A hydraulic steering arrangement according to claim 7, wherein the throttle is a constant throttle.

* * * * *